US011528439B2

(12) United States Patent
Kim et al.

(10) Patent No.: US 11,528,439 B2
(45) Date of Patent: Dec. 13, 2022

(54) IMAGE SENSOR, IMAGE PROCESSING SYSTEM INCLUDING THE SAME, AND OPERATING METHOD OF THE SAME

(71) Applicant: SAMSUNG ELECTRONICS CO., LTD., Suwon-si (KR)

(72) Inventors: Sunjung Kim, Hwaseong-si (KR); Sejun Kim, Seoul (KR); Hoyong Na, Daegu (KR); Seongyeop Park, Suwon-si (KR); Jihun Shin, Seongnam-si (KR); Minwoo Lee, Hwaseong-si (KR); Youngtae Jang, Pyeongtaek-si (KR); Youngkyun Jeong, Hwaseong-si (KR); Jinkyeong Heo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/032,373

(22) Filed: Sep. 25, 2020

(65) Prior Publication Data

US 2021/0274121 A1 Sep. 2, 2021

(30) Foreign Application Priority Data

Feb. 28, 2020 (KR) ........................ 10-2020-0024777

(51) Int. Cl.
*H04N 5/3745* (2011.01)
*H04N 5/378* (2011.01)
*H04N 5/369* (2011.01)

(52) U.S. Cl.
CPC ......... *H04N 5/3745* (2013.01); *H04N 5/3698* (2013.01); *H04N 5/378* (2013.01)

(58) Field of Classification Search
CPC .... H04N 5/3745; H04N 5/3698; H04N 5/378; H04N 5/3559
See application file for complete search history.

(56) References Cited

U.S. PATENT DOCUMENTS 7,075,049 B2 7/2006 Rhodes et al.
8,325,256 B2 12/2012 Egawa
8,786,745 B2 7/2014 Kawahito et al.
9,402,039 B2 7/2016 Solhusvik et al.
9,609,256 B2 3/2017 Haraguchi
10,447,956 B2 10/2019 Shimamura et al.

(Continued)

*Primary Examiner* — Sinh Tran
*Assistant Examiner* — Zhenzhen Wu
(74) *Attorney, Agent, or Firm* — Lee IP Law, P.C.

(57) ABSTRACT

An image sensor includes a dual conversion gain pixel to output a high conversion gain signal according to a high conversion gain and output a low conversion gain signal according to a low conversion gain, by adjusting a conversion gain; a scaler to scale a voltage level of the high conversion gain signal; a ramp generator to generate a first ramp signal and a second ramp signal, slopes of the first and second ramp signals being different from each other; a comparator to compare the scaled high conversion gain signal and the first ramp signal to output a first comparison result, and compare the low conversion gain signal and the second ramp signal to output a second comparison result; and a counter to output a first counting result value based on the first comparison result and output a second counting result value based on the second comparison result.

19 Claims, 14 Drawing Sheets

(56) References Cited

U.S. PATENT DOCUMENTS

| | | | | |
|---|---|---|---|---|
| 2011/0032401 | A1* | 2/2011 | Nikai | H04N 5/3575<br>348/294 |
| 2011/0174801 | A1* | 7/2011 | Schwerman | H03K 7/10<br>219/509 |
| 2016/0088248 | A1* | 3/2016 | Lee | H04N 5/378<br>348/295 |
| 2016/0126968 | A1* | 5/2016 | Lesso | H03M 7/30<br>341/155 |
| 2017/0208273 | A1* | 7/2017 | Mandelli | H04N 5/363 |
| 2017/0324918 | A1* | 11/2017 | Takatsuka | H04N 5/357 |
| 2018/0205897 | A1* | 7/2018 | Kim | H04N 5/3575 |
| 2018/0302578 | A1* | 10/2018 | Ebihara | H01L 27/1255 |
| 2019/0020832 | A1* | 1/2019 | Takane | H04N 5/23245 |
| 2019/0098232 | A1 | 3/2019 | Mori et al. | |
| 2019/0222780 | A1* | 7/2019 | Chang | H04N 5/3559 |
| 2019/0246057 | A1* | 8/2019 | Ebihara | H04N 5/3559 |
| 2021/0037201 | A1* | 2/2021 | Tantawy | H04N 5/37457 |
| 2021/0151485 | A1* | 5/2021 | Ma | H04N 5/37452 |
| 2021/0217799 | A1* | 7/2021 | Stefanov | H01L 27/14643 |

* cited by examiner

1H
AZ
HRST
HSIG
LSIG
LRST
AZ
VRAMP
ADJ_VRAMP
VPIX
SPIX
ADJ_VRAMP, SPIX
CNTEN
VHRES
VHSIG
VLSIG
VLRES
SPIX

160a
IR0
IR1
IR2
IRN
VDD
BPA
CASP
PR01
PR02
PR03
PR04
C01
PR11
PR12
PR13
PR14
C11
PR21
PR22
PR23
PR24
C21
PRN1
PRN2
PRN3
PRN4
CN1
SLb<0>
SL<0>
SLb<1>
SL<1>
SLb<2>
SL<2>
SLb<N>
SL<N>
RRAMP
VSS

FIG. 12

| | AG1X | AG4X | AG16X |
|---|---|---|---|
| DR [dB] | 78.7 | 79.6 | 81.1 |
| RN [e-] | 4.5 | 1.3 | 1.0 |
| SNR DIP [dB] | 0 | -0.76 | -3.41 |

1H
AZ
HRST
LRST
LSIG
HSIG
RX
DRX
TX
AX
VPIX
VRAMP
CNTEN
VHRRES, VLRES
VLSIG
VHSIG
VPIX

1H
AZ
HRST
LRST
LSIG
HSIG
VRAMP
VPIX
VHRES, VLRES
VLSIG
SPIX
VHSIG
SPIX
ADJ_VRAMP
VPIX, SPIX
ADJ_VRAMP, SPIX
CNTEN

1000
APPLICATION PROCESSOR
1110
PHY
1113
DigRF MASTER
1114
CSI HOST
DES
1112
DSI HOST
SER
1111
MIPI DigRF
RF CHIP
1160
PHY
1161
DigRF SLAVE
1162
GPS
1120
CAMERA SERIAL INTERFACE
DISPLAY SERIAL INTERFACE
SER
CSI DEVICE
IMAGE SENSOR
1141
1140
DES
DSI DEVICE
DISPLAY
1151
1150
UWB
1210
WLAN
1220
WIMAX
1230
SPEAKER
1190
MIC
1180
STORAGE
1170
DRAM
1185

IMAGE SENSOR, IMAGE PROCESSING SYSTEM INCLUDING THE SAME, AND OPERATING METHOD OF THE SAME

CROSS-REFERENCE TO RELATED APPLICATION

Korean Patent Application No. 10-2020-0024777, filed on Feb. 28, 2020, in the Korean Intellectual Property Office, and entitled: "Image Sensor, Image Processing System Including the Same, and Method of Operating the Same," is incorporated by reference herein in its entirety.

BACKGROUND

1. Field

Embodiments relate to an image sensor, an image processing system including the image sensor, and a method of operating the image sensor.

2. Description of the Related Art

A complementary Metal Oxide Semiconductor (CMOS) image sensor is an image pickup device manufactured using a CMOS process, and has advantages of low manufacturing cost, low power consumption, and high integration compared to, e.g., a charge-coupled device (CCD) image sensor. Main performance indicators for the CMOS image sensor include dynamic range, noise, frame rate, sensitivity, color gamut, power consumption, and sensor size. Depending on specific application fields, specific indicators may be emphasized. In a field requiring high reliability and stability, a CMOS image sensor may provide high dynamic range and low noise performance.

SUMMARY

Embodiments are directed to an image sensor, including a dual conversion gain (DCG) pixel configured to output a high conversion gain signal according to a high conversion gain and output a low conversion gain signal according to a low conversion gain, by adjusting a conversion gain; a scaler configured to scale a voltage level of the high conversion gain signal; a ramp generator configured to generate a first ramp signal and a second ramp signal, a slope of the second ramp signal being different from a slope of the first ramp signal; a comparator configured to compare the scaled high conversion gain signal and the first ramp signal to output a first comparison result, and compare the low conversion gain signal and the second ramp signal to output a second comparison result; and a counter configured to output a first counting result value based on the first comparison result and output a second counting result value based on the second comparison result.

Embodiments are also directed to an image processing system, including a dual conversion gain (DCG) pixel array including a plurality of DCG pixels, each DCG pixel configured to output a high conversion gain signal according to a high conversion gain and output a low conversion gain signal according to a low conversion gain, by adjusting a conversion gain; a ramp generator configured to generate a first ramp signal and a second ramp signal; a correlated double sampler configured to scale a voltage level of the high conversion gain signal, compare the scaled high conversion gain signal and the first ramp signal to output a first comparison result, and compare the low conversion gain signal and the second ramp signal to output a second comparison result; and a counter configured to output a first counting result value based on the first comparison result and output a second counting result value based on the second comparison result.

Embodiments are also directed to a method of operating an image sensor, the method including outputting a high conversion gain signal according to a high conversion gain and outputting a low conversion gain signal according to a low conversion gain, by adjusting a conversion gain; scaling a voltage level of the high conversion gain signal; outputting a first comparison result by comparing the scaled high conversion gain signal and a first ramp signal to output a first counting result value based on the first comparison result; and outputting a second comparison result by comparing the low conversion gain signal and a second ramp signal to output a second counting result value based on the second comparison result.

BRIEF DESCRIPTION OF THE DRAWINGS

Features will become apparent to those of skill in the art by describing in detail example embodiments with reference to the attached drawings in which:

FIG. 12 is a diagram for describing a change in a dynamic range and a magnitude of random noise when an analog gain is increased.

DETAILED DESCRIPTION

Figure 1:
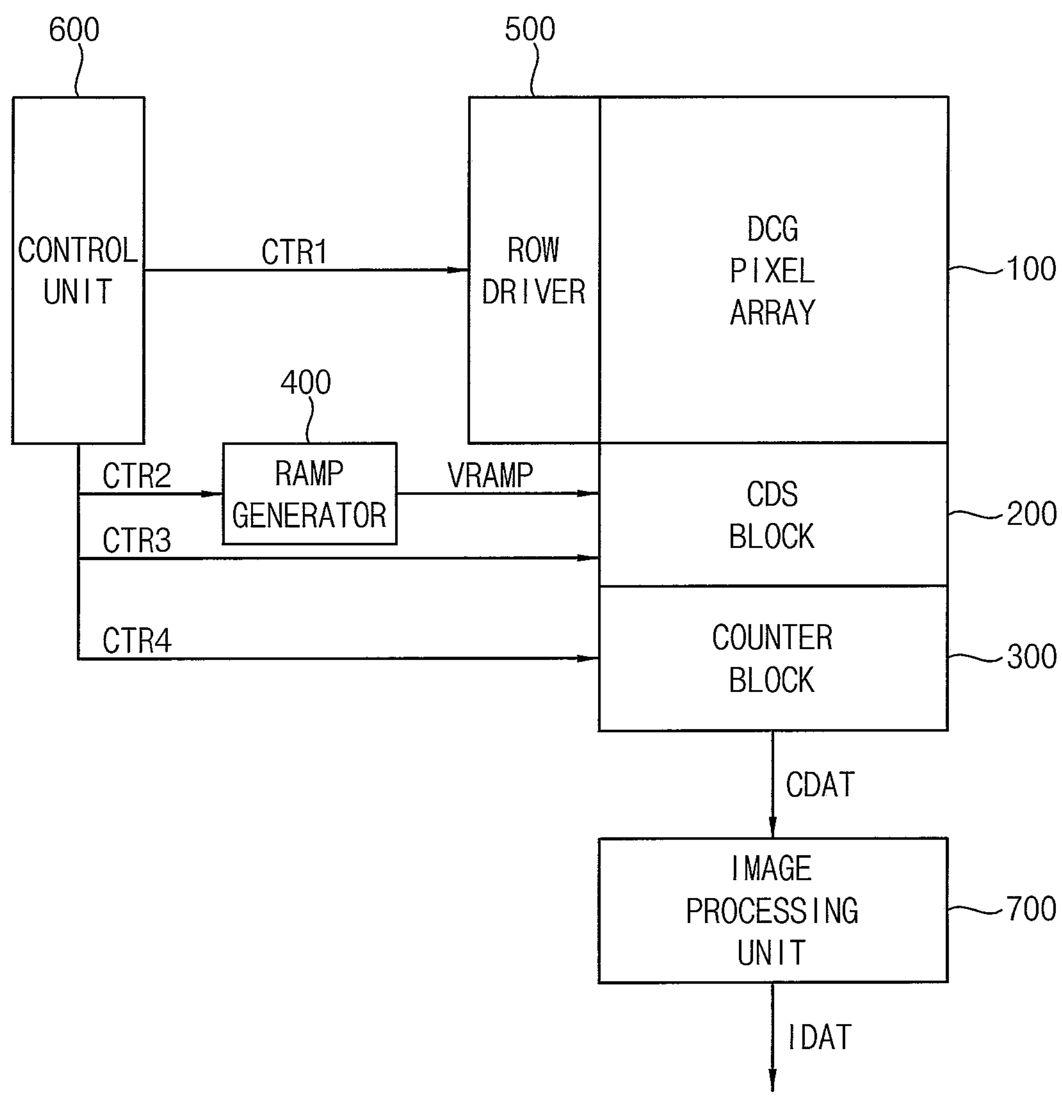
FIG. 1 is a block diagram illustrating an image sensor according to an example embodiment.

FIG. 1 is a block diagram illustrating an image sensor according to an example embodiment.

Referring to FIG. 1, an image sensor 10 according to the present example embodiment includes a dual conversion gain (DCG) pixel array 100, a correlated double sampling (CDS) block 200, a counter block 300, a ramp generator 400, a row driver 500, a control unit 600, and an image processing unit 700.

The DCG pixel array 100 may include a plurality of DCG pixels. The plurality of DCG pixels may be arranged in a matrix form. Each of the plurality of DCG pixels may be connected to one of a plurality of rows and one of a plurality of columns. The DCG pixel array 100 may detect an incident light according to a shutter operation, perform a photoelectric conversion, and generate and output a plurality of analog pixel signals based on photo-charges generated by the photoelectric conversion. A conversion gain may be adjusted in a process of generating the plurality of analog pixel signals. In an example embodiment, in the process of generating the plurality of analog pixel signals, the DCG pixel array 100 may generate a high conversion gain signal according to a high conversion gain and generate a low conversion gain signal according to a low conversion gain. The conversion gain may be adjusted by driving a dual gain transistor included in the DCG pixel array 100, as described in further detail below.

The CDS block 200 may include a plurality of CDS circuits. The plurality of CDS circuits may be connected to the plurality of columns of the DCG pixel array 100 and perform a CDS operation on the plurality of analog pixel signals output from the DCG pixel array 100. One of the plurality of CDS circuits may be connected to one column of the DCG pixel array 100 to perform the CDS operation on an analog pixel signal output from the one column of the plurality of columns.

The counter block 300 may include a plurality of counters. The plurality of counters may be connected to the plurality of columns of the DCG pixel array 100 through the plurality of CDS circuits. The plurality of counters may count the plurality of analog pixel signals, i.e., analog pixel signals which CDS operation is performed on, output from the DCG pixel array 100 in parallel, i.e., simultaneously, to generate counting results, and convert them into a plurality of digital signals CDAT. In an example embodiment, one of the plurality of counters may be connected to one of the plurality of columns through one of the plurality of CDS circuits, may count one of the analog pixel signals to generate a counting result, and may convert the counting result into one of the plurality of digital signal CDAT. Operations of the CDS block 200 and the counter block 300 described above may be performed in units of rows of the DCG pixel array 100.

The ramp generator 400 may include current sources, resistors, and capacitors. The current sources may generate currents, and the resistors and the capacitors may generate a ramp signal VRAMP falling or rising at a predetermined slope using the respective currents.

The row driver 500 may be connected to a plurality of rows of the DCG pixel array 100 and may drive the plurality of DCG pixels connected to the rows in units of rows.

The control unit 600 may generate control signals CTR1, CTR2, CTR3, and CTR4. The control unit 600 may control overall operations of components 100, 200, 300, 400, 500, and 700 included in the image sensor 10 using the control signals CTR1, CTR2, CTR3, and CTR4. The control unit 600 may control an operation timing of the components 100, 200, 300, 400, 500, and 700 using the control signals CTR1, CTR2, CTR3, and CTR4. In an example embodiment, the control unit 600 may control the ramp generator 400 to adjust the ramp signal VRAMP, and may control the CDS block 200 or the counter block 300 to adjust a voltage level of the analog pixel signals output from the DCG pixel array 100.

The image processing unit 700 may receive the plurality of digital signals output from the counter block 300, and may generate image data IDAT by applying various digital imaging algorithms to the plurality of digitals and performing image synthesis, and transmit the image data IDAT to an interface. Although not illustrated in FIG. 1, the image sensor 10 may further include buffers to transmit a plurality of digital signals output from the counter block 300 to the image processing unit 700, and may further include column drivers to drive columns included in the DCG pixel array 100.

Figure 2:
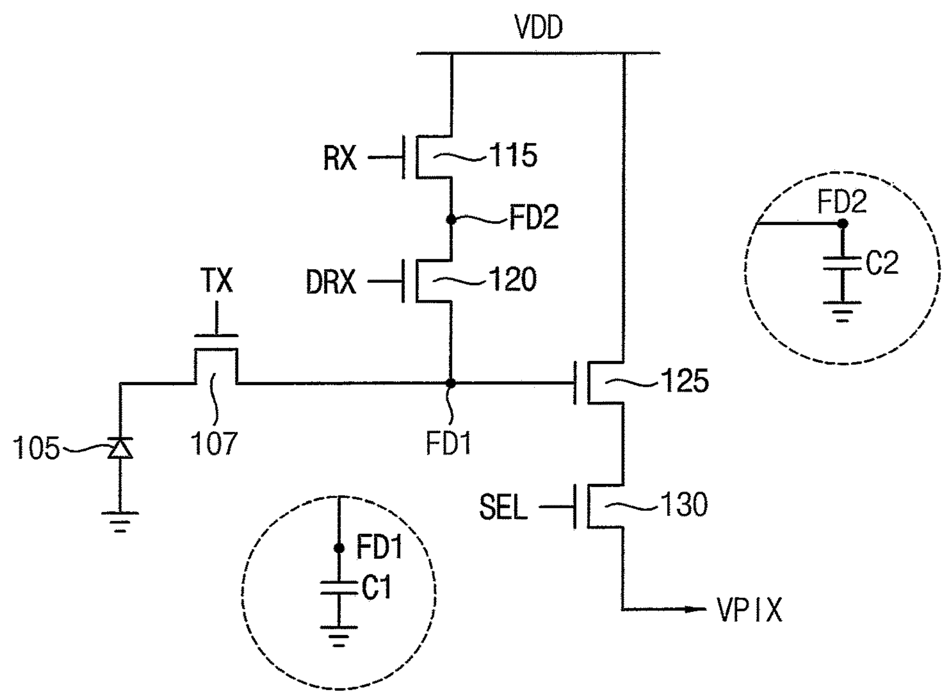
FIG. 2 is a circuit diagram illustrating a structure of Dual Conversion Gain (DCG) pixel included in a DCG pixel array illustrated in FIG. 1.
Figure 3:
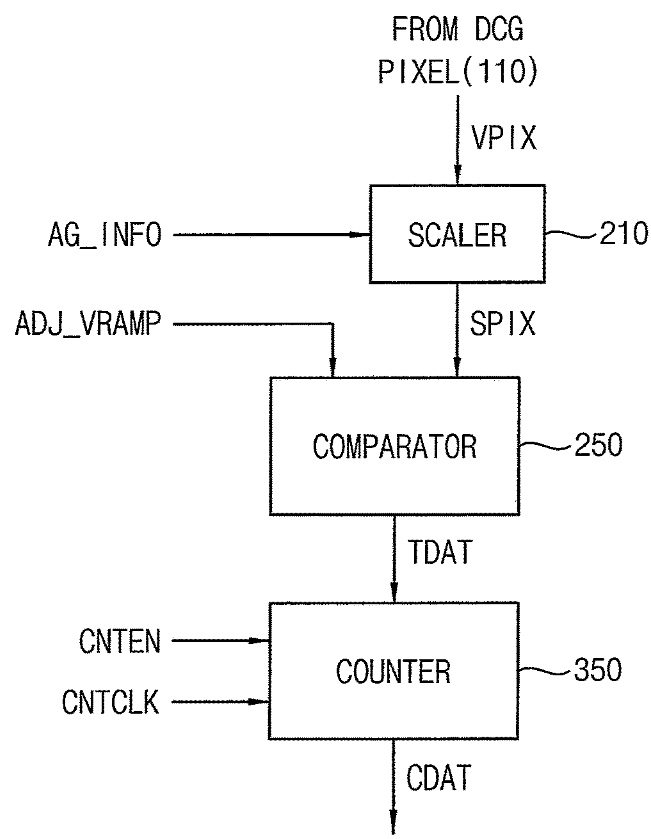
FIG. 3 is a block diagram illustrating a scaler, a comparator, and a counter in a Correlated Double Sampling (CDS) block or a counter block illustrated in FIG. 1.
Figure 4:
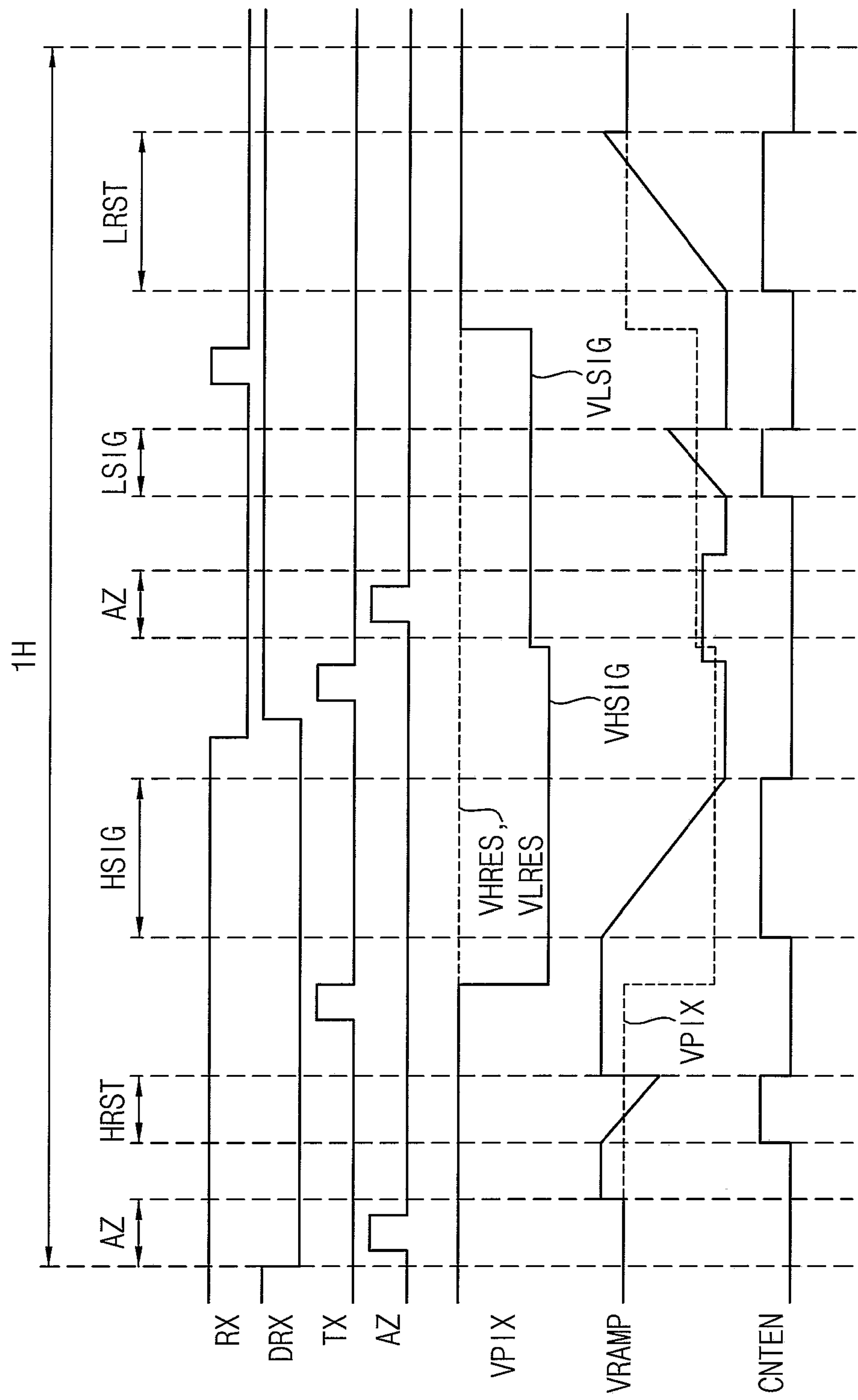
FIGS. 4 and 5 are timing diagrams illustrating operations of the image sensor of FIG. 1 operating at an ADC timing of Reset-Sig-Sig-Reset (RSSR).
Figure 5:
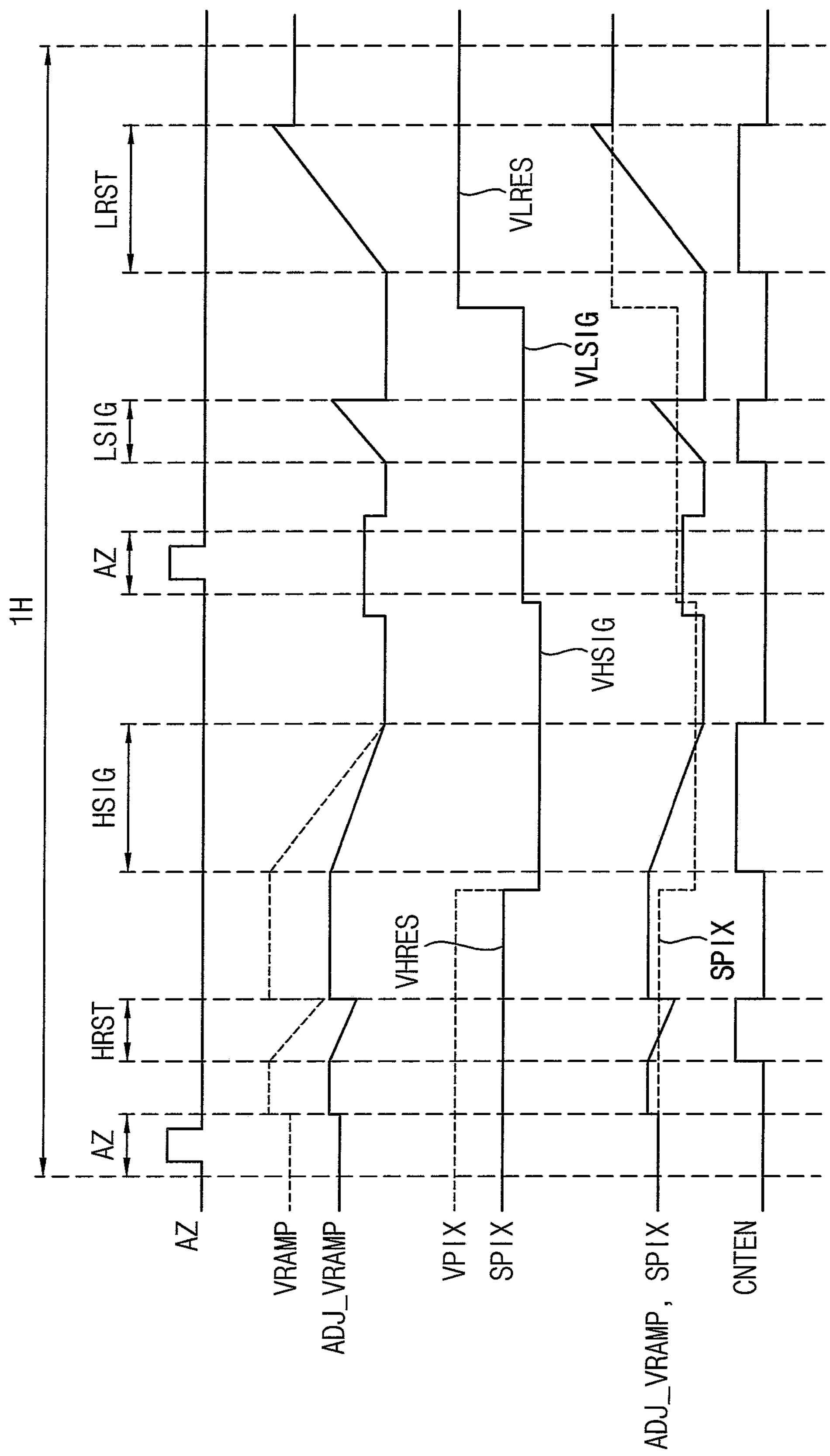

FIG. 2 is a circuit diagram illustrating a structure of Dual Conversion Gain (DCG) pixel included in a DCG pixel array illustrated in FIG. 1. FIG. 3 is a block diagram illustrating a scaler, a comparator, and a counter in a Correlated Double Sampling (CDS) block or a counter block illustrated in FIG. 1. FIGS. 4 and 5 are timing diagrams illustrating operations of the image sensor of FIG. 1 operating at an ADC timing of Reset-Sig-Sig-Reset (RSSR).

In FIG. 2, one of a plurality of DCG pixels 110 included in a DCG pixel array 100 is illustrated in FIG. 1. As described above, since the plurality of DCG pixels 110 are arranged in a matrix form and each DCG pixel may be driven in units of rows, descriptions of a structure and an operation of one DCG pixel 110 may be applied to the other pixels connected to the same row.

Referring to FIG. 1, the DCG pixel 110 according to the present example embodiment includes a photoelectric converter 105, a transfer transistor 107, a reset transistor 115, a dual gain transistor 120, a drive transistor 125, and a selection transistor 130.

The photoelectric converter 105 may be connected between a ground node and the transfer transistor 107. The transfer transistor 107 may be connected between the photoelectric converter 105 and a floating diffusion node FD1. The reset transistor 115 may be connected between a power supply voltage VDD and a second floating diffusion node FD2. The dual gain transistor 120 may be connected between the first floating diffusion node FD1 and the second floating diffusion node FD2. The drive transistor 125 may be connected between the power supply voltage VDD and the selection transistor 130. The selection transistor 130 may be connected between the drive transistor 125 and an output terminal of the DCG pixel 110.

With the above-described configuration, the DCG pixel 110 may detect an incident light according to a shutter operation, perform a photoelectric conversion, output an analog pixel signal based on photo-charges generated by the photoelectric conversion, and adjust a conversion gain in a process of generating the analog pixel signal.

In an example embodiment, the photoelectric conversion is performed by the photoelectric converter 105, and the output of the analog pixel signal may be performed by a plurality of transistors 107, 115, 120, 125, and 130. In an example embodiment, the plurality of transistors 107, 115, 120, 125, and 130 may be driven by the control unit 600. The control unit 600 may generate a control signal CTRL1 and transmit the control signal CTRL1 to the plurality of transistors 107, 115, 120, 125, and 130.

In an example embodiment, the transfer transistor 107 may be driven by receiving a transfer signal TX as a gate signal. The reset transistor 115 may be driven by receiving a reset signal RX as a gate signal. The dual gain transistor

120 may be driven by receiving a dual gain signal DRX as a gate signal. The drive transistor 125 may be driven by receiving a voltage of the first floating diffusion node FD1 as a gate signal. The selection transistor 130 may be driven by receiving a selection signal SEL as a gate signal. The control signal CTRL1 may include the transfer signal TX, the reset signal RX, the dual gain signal DRX, and the selection signal SEL.

Hereinafter, the process of outputting the analog pixel signal by the DCG pixel 110 will be described in detail, referring first to FIG. 4 and then to FIG. 3.

In FIGS. 4 and 5, a first time period, i.e., 1H time period, is illustrated. The first time period may be a time for driving a plurality of DCG pixels 110 included in the DCG pixel array 100 illustrated in FIG. 1 in a row unit.

Referring to FIGS. 4 and 5, the first time period may include a plurality of second time periods AZ, HRST, HSIG, LSIG, and LRST. After an auto zero period AZ, the following periods may proceed in sequence: a high conversion gain reset signal period HRST, a high conversion gain image signal period HSIG, an auto zero period AZ, a low conversion gain image signal period LSIG, and a low conversion gain reset signal period LRST. In the plurality of second time periods HRST, HSIG, LSIG, and LRST (i.e., except the auto zero period AZ), a high conversion gain reset signal VHRES, a high conversion gain image signal VHSIG, a low conversion gain image signal VLSIG, and a low conversion gain reset signal VLRES may be output, respectively. The analog signals VHRES, VHSIG, VLSIG, and VLRES may be converted into digital signals in the order in which the analog signals VHRES, VHSIG, VLSIG, and VLRES are output, as described below.

The high conversion gain is a conversion gain greater than the low conversion gain. The conversion gain is a ratio of the analog pixel signal output from the DCG pixel 110 to the unit photo-charge generated by the photoelectric conversion. The unit of the conversion gain may be [V/e]. The conversion gain may be adjusted by driving the dual gain transistor 120 included in the DCG pixel 110. In an example embodiment, the conversion gain may be adjusted to a low conversion gain by turning on the dual gain transistor 120 by applying the dual gain signal DRX of a logic high level to the gate of the dual gain transistor 120, and the conversion gain may be adjusted to a high conversion gain by turning off the dual gain transistor 120 by applying the dual gain signal DRX of a logic low level to the gate of the dual gain transistor 120. As described above, the dual gain transistor 120 may be connected between the first floating diffusion node FD1 and the second floating diffusion node FD2. The conversion gain may be adjusted by changing a combined capacitance C1+C2 (which corresponds to the floating diffusion nodes FD1 and FD2) depending on whether the dual gain transistor 120 is driven.

Referring to FIG. 4 again, in the auto zero period AZ, an adjustment between a voltage level of a ramp signal VRAMP and a voltage level of an analog pixel signal VPIX may be performed. In the high conversion gain reset signal period HRST, a high conversion gain reset signal VHRES may be output by applying a reset signal RX of a logic high level to a gate of the reset transistor 115 and applying a dual gain signal DRX of a logic low level to a gate of the dual gain transistor 120. A high conversion gain image signal VHSIG may be output in the high conversion gain image signal period HSIG by applying a transfer signal TX of a logic high level to a gate of the transfer transistor 107 before the high conversion gain image signal period HSIG.

A low conversion gain image signal VLSIG may be output in the low conversion gain image signal period LSIG by applying a reset signal RX of a logic low level to a gate of the reset transistor 115 before the low conversion gain image signal period LSIG, applying a dual gain signal DRX of a logic high level to a gate of the dual gain transistor 120 and applying a transfer signal TX of a logic high level to a gate of the transfer transistor 107. A low conversion gain reset signal VLRES may be output in the low conversion reset signal period LRST by applying a reset signal RX of a logic high level to a gate of the reset transistor 115 before the low conversion reset signal period LRST.

As described above, the DCG pixel 110 may output the analog pixel signal VPIX. The analog pixel signal VPIX may include a high conversion gain signal and a low conversion gain signal. The high conversion gain signal may include the high conversion gain reset signal VHRES and the high conversion gain image signal VHSIG. The low conversion gain signal may include the low conversion gain reset signal VLRES and the low conversion gain image signal VLSIG.

Meanwhile, the analog pixel signal VPIX output from the DCG pixel 110 is typically compared with a ramp signal VRAMP and converted into a comparison result, and the comparison result is counted by a counter and converted into a counting result value CDAT. The counting result value CDAT is finally converted into a digital signal IDAT, and the analog pixel signal VPIX is converted into the digital signal IDAT through a series of processes.

However, it should be noted that the image sensor of FIG. 1 may be driven in the following manner to exhibit a high dynamic range and a low noise performance to provide high reliability and stability.

Referring now to FIG. 3, a scaler 210 may receive an analog pixel signal VPIX from the DCG pixel 110 and receive analog gain information AG_INFO from the control unit 600. The analog gain information AG_INFO may include information about a scale factor or predetermined multiple (a number), i.e., K times, where K is an integer equal to or greater than 2. In an example embodiment, the analog gain information AG_INFO may be one of 4 times and 16 times, for example.

The scaler 210 may scale only a voltage level of the high conversion gain signal included in the analog pixel signal VPIX based on the analog gain information AG_INFO. The scaler 210 may transmit a signal SPIX, by scaling only the voltage level of the high conversion gain signal and maintaining the voltage level of the low conversion gain signal, to a comparator 250. The analog pixel signal VPIX may include the high conversion gain signal and the low conversion gain signal, and the signal SPIX output from the scaler 210 may include the scaled high conversion gain signal and the unscaled low conversion gain signal.

The comparator 250 may receive the scaled high conversion gain signal and the unscaled low conversion gain signal SPIX from the scaler 210, and receive an adjusted ramp signal ADJ_VRAMP including the first ramp signal and the second ramp signal from the ramp generator 400.

The comparator 250 may generate a first comparison result by comparing the scaled high conversion gain signal and the first ramp signal, and generate a second comparison result by comparing the unscaled low conversion gain signal and the second ramp signal. The comparator 250 may output the first comparison result and the second comparison result as a comparison result TDAT.

In an example embodiment, the slope of the first ramp signal may be adjusted to output the first comparison result corresponding to the scaled high conversion gain signal. In an example embodiment, the absolute value of the slope of the first ramp signal may be adjusted to be smaller than the absolute value of the slope of the second ramp signal. A specific structure and operation of a ramp generator for generating the first ramp signal and the second ramp signal will be described below with reference to FIGS. 6A and 6B. A relationship between the scaled high conversion gain signal and the first ramp signal will be described below with reference to FIG. 7.

A counter 350 may receive the first comparison result and the second comparison result from the comparator 250, and receive a counter enable signal CNTEN and a counter clock CNTCLK from the control unit 600. The counter 350 may output a first counting result value (based on the first comparison result) and a second counting result value (based on the second comparison result), as a counting result value CDAT.

Figure 6A:
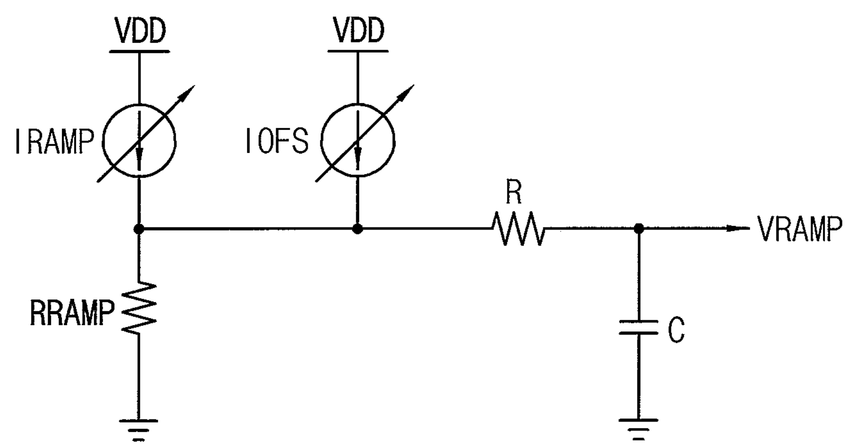
FIG. 6A is a circuit diagram illustrating an example embodiment of a ramp generator included in an image sensor of FIG. 1.
Figure 6B:
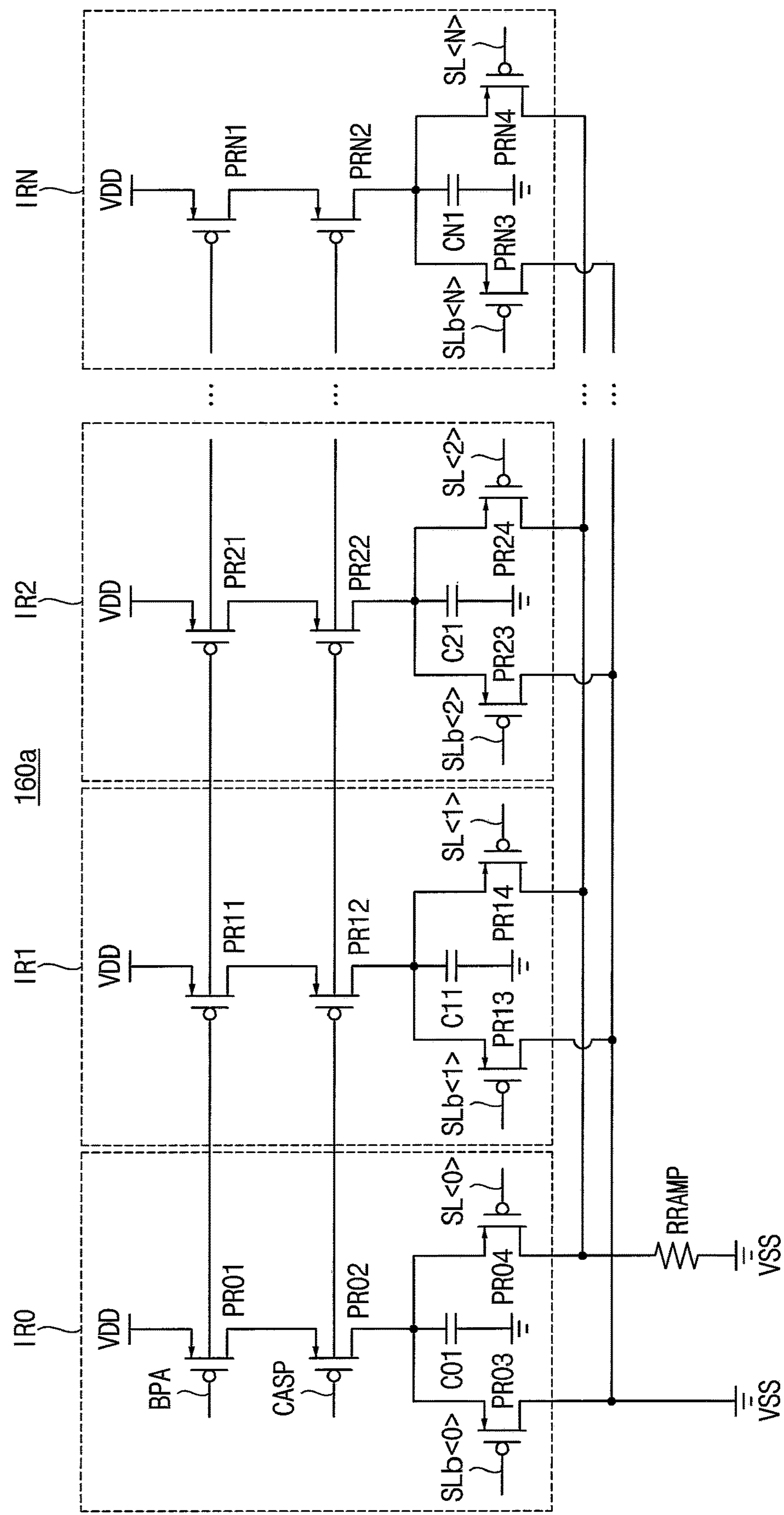
FIG. 6B is a circuit diagram illustrating a structure of the ramp generator of FIG. 6A.

FIG. 6A is a circuit diagram illustrating an example embodiment of a ramp generator included in an image sensor of FIG. 1. FIG. 6B is a circuit diagram illustrating a structure of the ramp generator of FIG. 6A.

Referring to FIGS. 1 and 6A, the ramp generator 400 may include a variable ramp current source IRAMP and a ramp resistor RRAMP. The ramp generator 400 may further include a resistor R and a capacitor C.

The variable ramp current source IRAMP and the ramp resistor RRAMP may be connected in series between a power supply voltage VDD and a ground voltage VSS. The resistor R may be connected between a node between the variable ramp current source IRAMP and the ramp resistor RRAMP and an output terminal for outputting the ramp signal VRAMP. The capacitor C may be connected between the output terminal and the ground voltage VSS.

A variable offset current source IOFS may be connected in parallel with the variable ramp current source IRAMP between the power supply voltage VDD and the ramp resistance RRAMP. As described above with reference to FIG. 3, the ramp generator 400 may be implemented by including a variable ramp current source IRAMP to generate the first ramp signal and the second ramp signal. The ramp generator 400 may be implemented by including the variable offset current source IOFS to decrease or increase the offset of the first ramp signal and the second ramp signal by a constant magnitude.

Referring to FIGS. 1, 6A and 6B, a ramp generator 400 may include a plurality of ramp current sources IR0, IR1, IR2, . . . , IRN connected in parallel and the ramp resistance RRAMP.

The plurality of ramp current sources IR0~IRN connected in parallel may correspond to the variable ramp current source IRAMP in FIG. 6A. In other words, the variable ramp current source IRAMP may include the plurality of ramp current sources IR0~IRN connected in parallel.

The ramp current source IR0 may include transistors PR01, PR02, PR03, and PR04 and a capacitor C01, and may operate in response to control signals BPA, CASP, SLb<0>, and SL<0>. The transistors PR01 and PR02 and the capacitor C01 may be connected in series between the power supply voltage VDD and the ground voltage VSS. The transistor PR03 may be connected between a node between the transistor PR02 and the capacitor C01 and the ground voltage VSS. The transistor PR04 and the ramp resistance RRAMP may be connected in series between the node between the transistor PR02 and the capacitor C01 and the ground voltage VSS. The control signals BPA, CASP, SLb<0>, and SL<0> may be applied to gate electrodes of the transistors PR01, PR02, PR03, and PR04, respectively.

The remaining ramp current sources IR1~IRN may have substantially the same configuration as the ramp current source IR0. For example, the ramp current source IR1 may include transistors PR11, PR12, PR13, and PR14 and a capacitor C11, and may operate in response to control signals BPA, CASP, SLb<1>, and SL<1>. The ramp current source IR2 may include transistors PR21, PR22, PR23, and PR24 and a capacitor C21, and may operate in response to control signals BPA, CASP, SLb<2>, and SL<2>. The ramp current source IRN may include transistors PRN1, PRN2, PRN3, and PRN4 and a capacitor CN1, and may operate in response to control signals BPA, CASP, SLb<N>, and SL<N>.

The plurality of ramp current sources IR0~IRN may be sequentially turned off when the level of the ramp signal VRAMP is to fall with the constant slope, and may be sequentially turned on when the level of the ramp signal VRAMP is to rise with the constant slope.

For example, all of the plurality of ramp current sources IR0~IRN may be substantially simultaneously or concurrently turned on at an initial operation time. When the level of the ramp signal VRAMP is to fall with the constant slope, the ramp current source IR0 may be turned off in response to the control signals SL<0> and SLb<0>, the ramp current source IR1 may be additionally turned off in response to the control signals SL<1> and SLb<1>, the ramp current source IR2 may be additionally turned off in response to the control signals SL<2> and SLb<2>, and the ramp current source IRN may be additionally turned off in response to the control signals SL<N> and SLb<N>. The ramp signal VRAMP may have the lowest voltage level when all the ramp current sources IR0~IRN are turned off.

After that, when the level of the ramp signal VRAMP is to rise with the constant slope, the ramp current source IR0 may be turned on in response to the control signals SL<0> and SLb<0>, the ramp current source IR1 may be additionally turned on in response to the control signals SL<1> and SLb<1>, the ramp current source IR2 may be additionally turned on in response to the control signals SL<2> and SLb<2>, and the ramp current source IRN may be additionally turned on in response to the control signals SL<N> and SLb<N>. The ramp current sources IR0 to IRN may be turned on or off at the same time to generate a ramp signal of a different slope.

Figure 7:
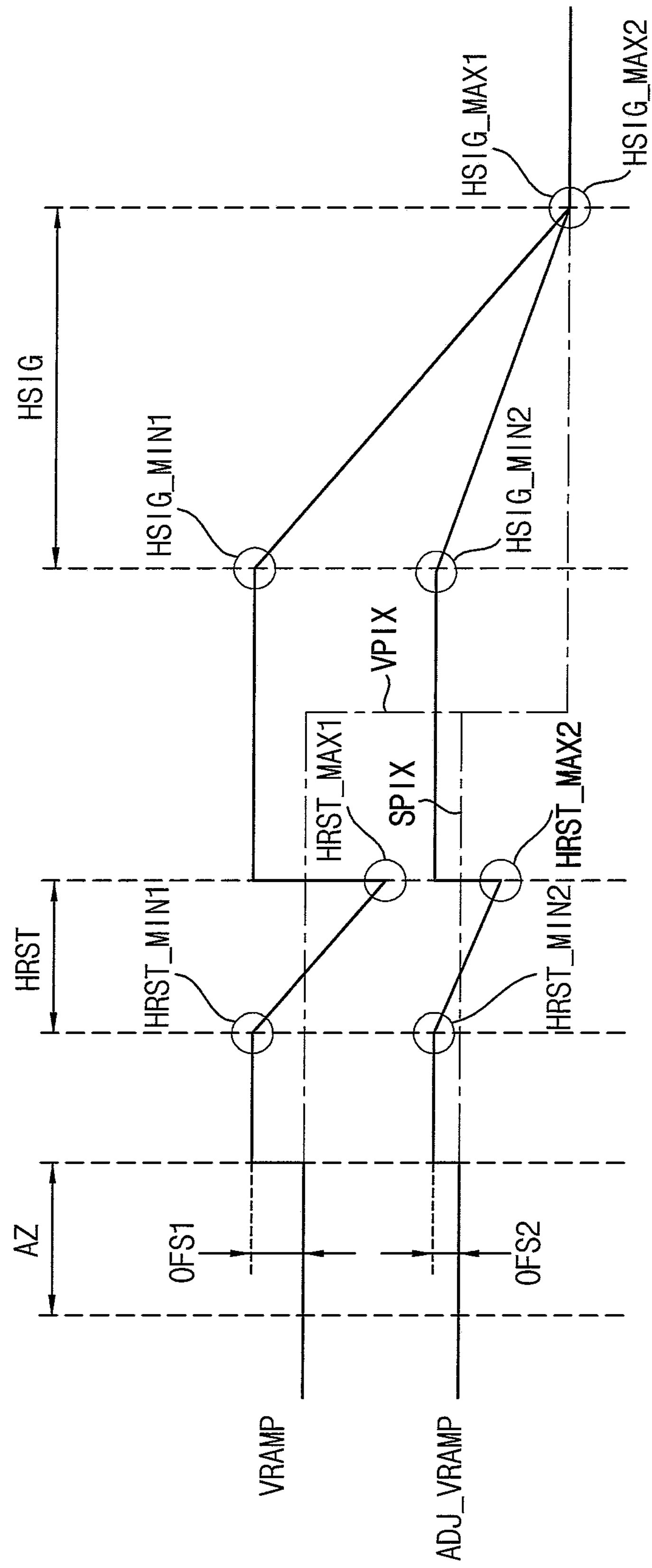
FIG. 7 is a diagram for describing a relationship between a scaled high conversion gain signal and a first ramp signal.

FIG. 7 is a diagram for describing a relationship between a scaled high conversion gain signal and a first ramp signal.

Referring to FIG. 7, the unscaled high conversion gain signal included in the analog pixel signal VPIX may be compared with an unadjusted ramp signal VRAMP to generate a comparison result. However, the high conversion gain signal scaled based on the analog gain information AG_INFO may not be compared with the unadjusted ramp signal VRAMP and thus the comparison result may not be generated. Therefore, a slope and an offset of the unadjusted ramp signal VRAMP is adjusted such that the adjusted ramp signal ADJ_VRAMP may be compared with the scaled high conversion gain signal. In an example embodiment, when the high conversion gain signal included in the analog pixel signal VPIX is scaled, in the high conversion gain reset signal period HRST, the ramp signal VRAMP with minimum and maximum values HRST_MIN1 and MRST_MAX1 may be adjusted to the adjusted ramp signal ADJ_VRAMP with minimum and maximum values HRST_MIN2 and HRST_MAX2. In the high conversion gain image signal period HSIG, the ramp signal VRAMP with minimum and maximum values HSIG_MIN1 and HSIG_MAX1 may be adjusted to the adjusted ramp signal ADJ_VRAMP with minimum and maximum values HSIG_MIN2 and HSIG_MAX2. In the auto zero period AZ, the ramp signal VRAMP with an offset OFS1 may be adjusted to the adjusted ramp signal ADJ_VRAMP with an offset OFS2. By the above-described adjustment, the adjusted ramp signal ADJ_VRAMP may be generated from the unadjusted ramp signal VRAMP.

Figure 8:
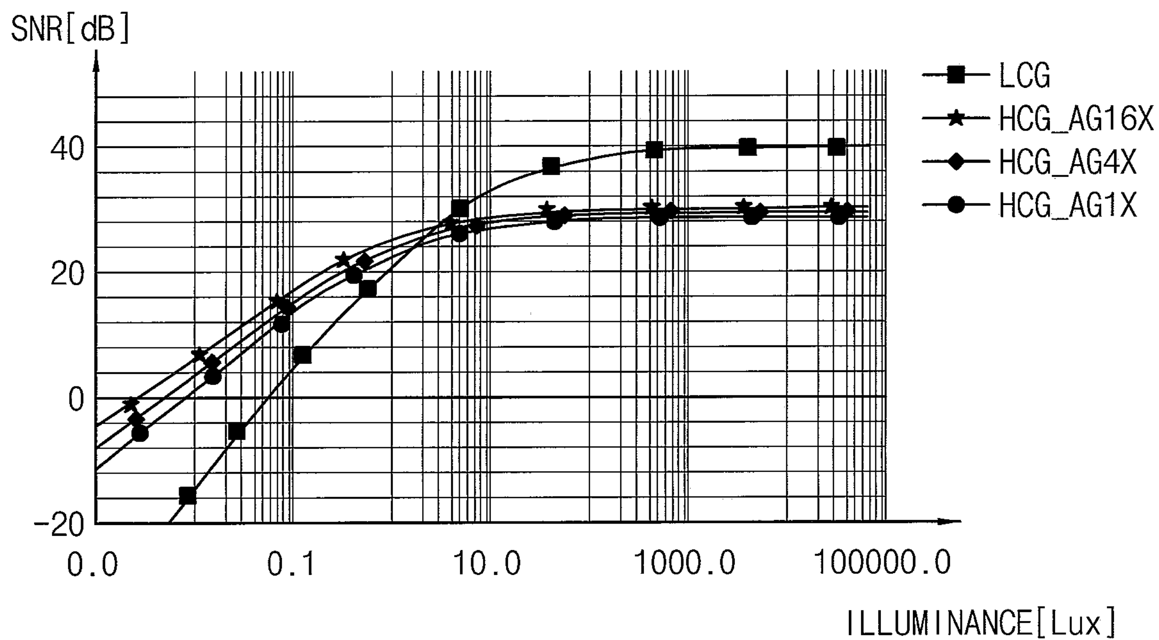
FIG. 8 is a graph illustrating a change in a signal-to-noise ratio of an analog pixel signal when an analog gain is increased.
Figure 9:
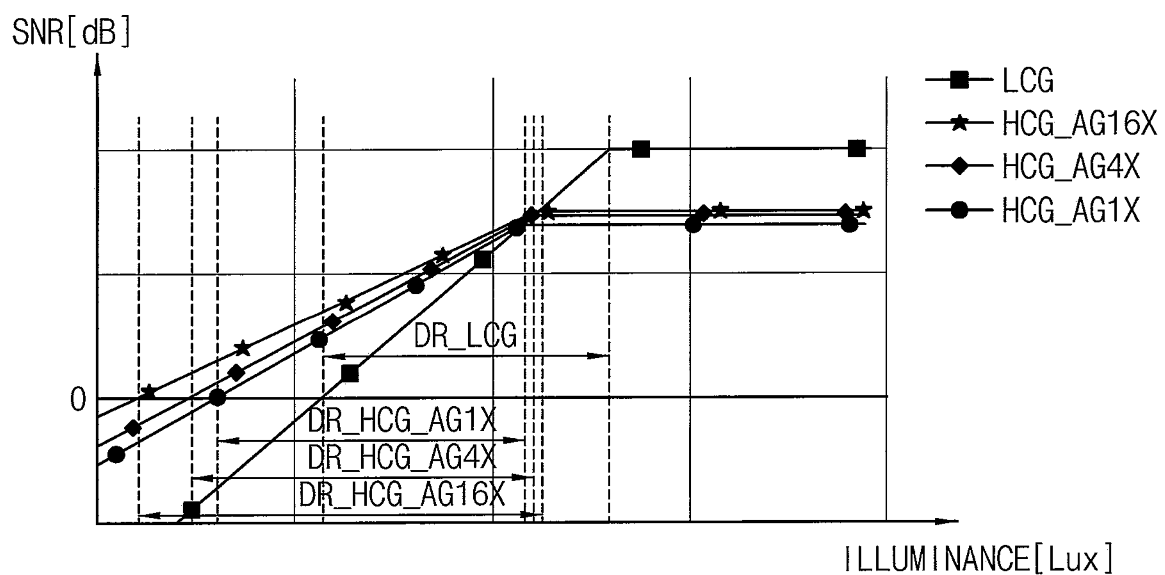
FIG. 9 is a graph illustrating a change in a dynamic range of an analog pixel signal when an analog gain is increased.
Figure 10:
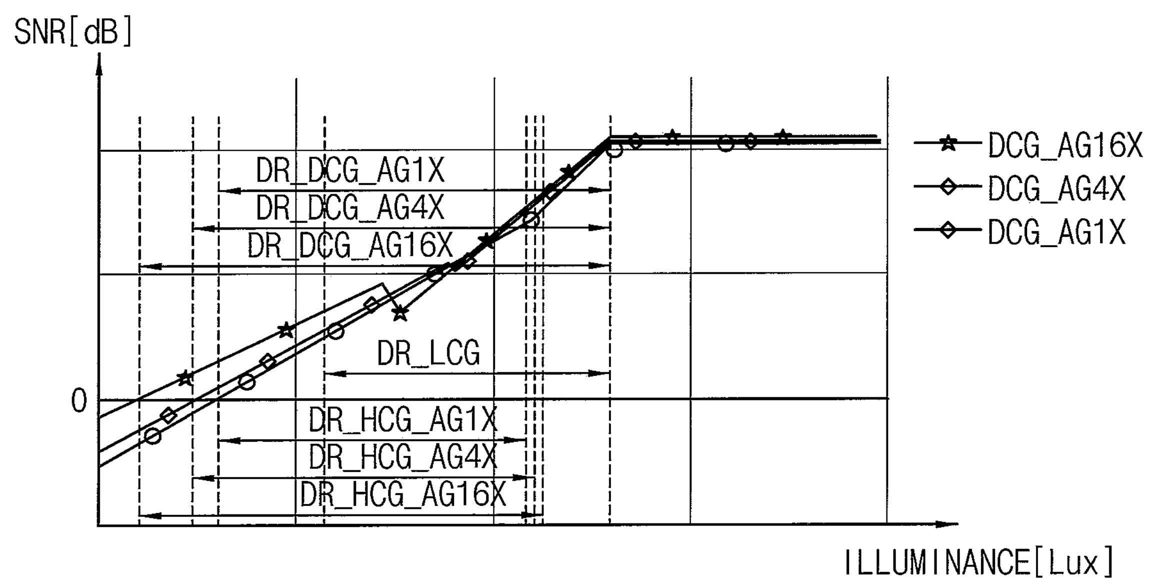
FIG. 10 is a graph illustrating a change in a dynamic range of image data generated based on an analog pixel signal when an analog gain is increased.

FIG. 8 is a graph illustrating a change in a signal-to-noise ratio of an analog pixel signal when an analog gain is increased. FIG. 9 is a graph illustrating a change in a dynamic range of an analog pixel signal when an analog gain is increased. FIG. 10 is a graph illustrating a change in a dynamic range of image data generated based on an analog pixel signal when an analog gain is increased.

In FIGS. 8, 9, and 10, an X-axis represents a magnitude of an incident light incident on the DCG pixel array in Lux units, and a Y-axis represents a signal-to-noise ratio in dB units.

Referring to FIGS. 1, 2, 3, and 8, when increasing an analog gain, for example, 1→4→16 times, a high conversion gain signal HCG_AG1X→HCG_AG4X→HCG_AG16X and a low conversion gain signal LCG which are included in an analog pixel signal VPIX output from a DCG pixel array 100 may be changed as illustrated.

Referring to FIG. 9, when increasing the analog gain, for example, 1→4→16 times, a dynamic range of the high conversion gain signal HCG_AG1X→HCG_AG4X→HCG_AG16X and a low conversion gain signal LCG may be changed as illustrated. The dynamic range may be measured from the point where the signal-to-noise ratio is 0 [dB] to the point where the signal-to-noise ratio is saturated in cases, i.e., when the analog gain is 1, 4, and 16 times.

Referring to FIG. 10, when increasing the analog gain, for example, 1→4→16 times, a dynamic range of the image data generated based on the analog pixel signal VPIX output from the DCG pixel array 100 may be changed as illustrated. The dynamic range may be measured from the point where the signal-to-noise ratio is 0 [dB] to the point where the signal-to-noise ratio is saturated in cases, i.e., when the analog gain is 1, 4, and 16 times.

When increasing the analog gain, the dynamic range of the low conversion gain signal does not change, but the dynamic range of the high conversion gain signal gradually increases. Therefore, the dynamic range of the image data generated based on the analog conversion signal VPIX including the high conversion gain signal and the low conversion gain signal is also gradually increased.

Figure 11:
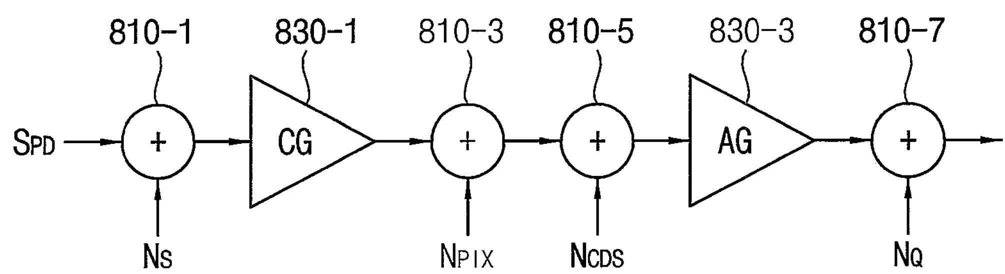
FIG. 11 is a diagram for describing a noise generated by an image sensor of FIG. 1.

FIG. 11 is a diagram for describing a noise generated by an image sensor of FIG. 1.

Referring to FIGS. 1, 2, and 11, a noise generated by an image sensor 10 of FIG. 1 may be modeled including adders 810-1, 810-3, 810-5, and 810-7 and buffers 830-1 and 830-3.

A signal $S_{PD}$ generated by a photoelectric converter 105 is affected by a shot noise $N_S$, a conversion gain CG, a pixel noise $N_{PIX}$, CDS noise $N_{CDS}$, an analog gain AG, and a quantization noise $N_Q$, until the signal $S_{PD}$ is finally converted to a digital signal IDAT. Meanwhile, an analog-to-digital conversion (ADC) noise generated by the CDS block 200 and the counter block 300 illustrated in FIG. 1 may be determined by Equation 1 below.

$$N_{ADC}=\sqrt{N^2_{CDS}+(N_Q|AG)^2} \quad \text{[Equation 1]}$$

In Equation 1, $N_{ADC}$ is the ADC noise, $N_{CDS}$ is the CDS noise, $N_Q$ is the quantization noise, and AG is the analog gain.

Therefore, when increasing the analog gain AG, it is possible to reduce the ADC noise $N_{ADC}$ by reducing the magnitude of the quantization noise $N_Q$.

FIG. 12 is a diagram for describing a change in a dynamic range and a magnitude of random noise when an analog gain is increased.

Referring to FIGS. 1 and 12, when increasing the analog gain AG, for example, 1→4→16 times (AG1X, AG4X, and AG16X, respectively), a dynamic range is increased to a magnitude of 78.7 dB→79.6 dB→81.1 dB. When increasing the analog gain AG, for example, 1→4→16 times, a random noise is decreased to a magnitude of 4.5 e−→1.3 e−→1.0 e−.

When increasing the analog gain AG, since an absolute value of a SNR dip increases, a digital signal DAT may be generated by applying a digital imaging algorithm by the image processing unit 700.

Figure 13:
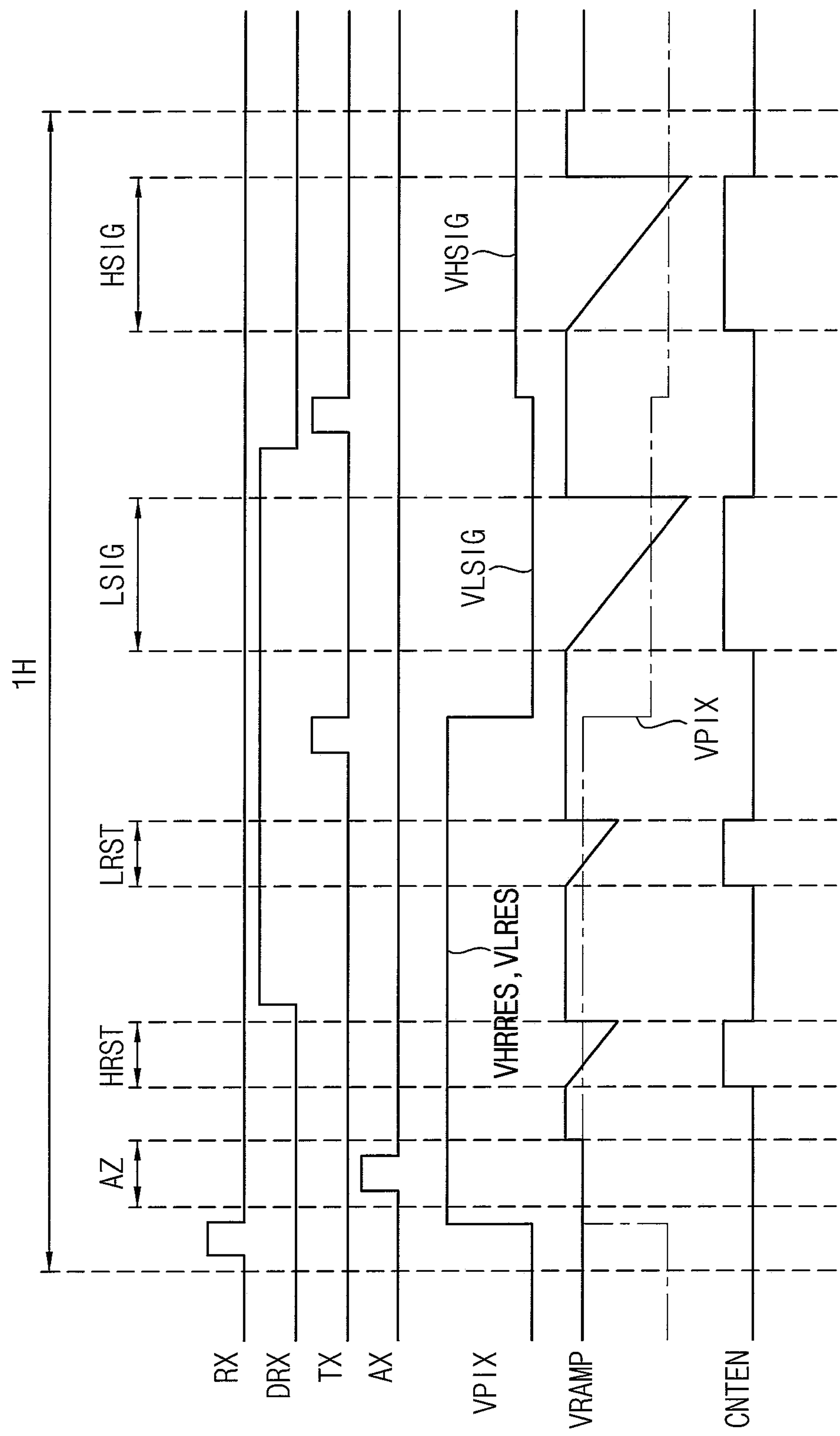
FIGS. 13 and 14 are timing diagrams illustrating operations of the image sensor of FIG. 1 operating at an ADC timing of Reset-Reset-Sig-Sig (RRSS).
Figure 14:
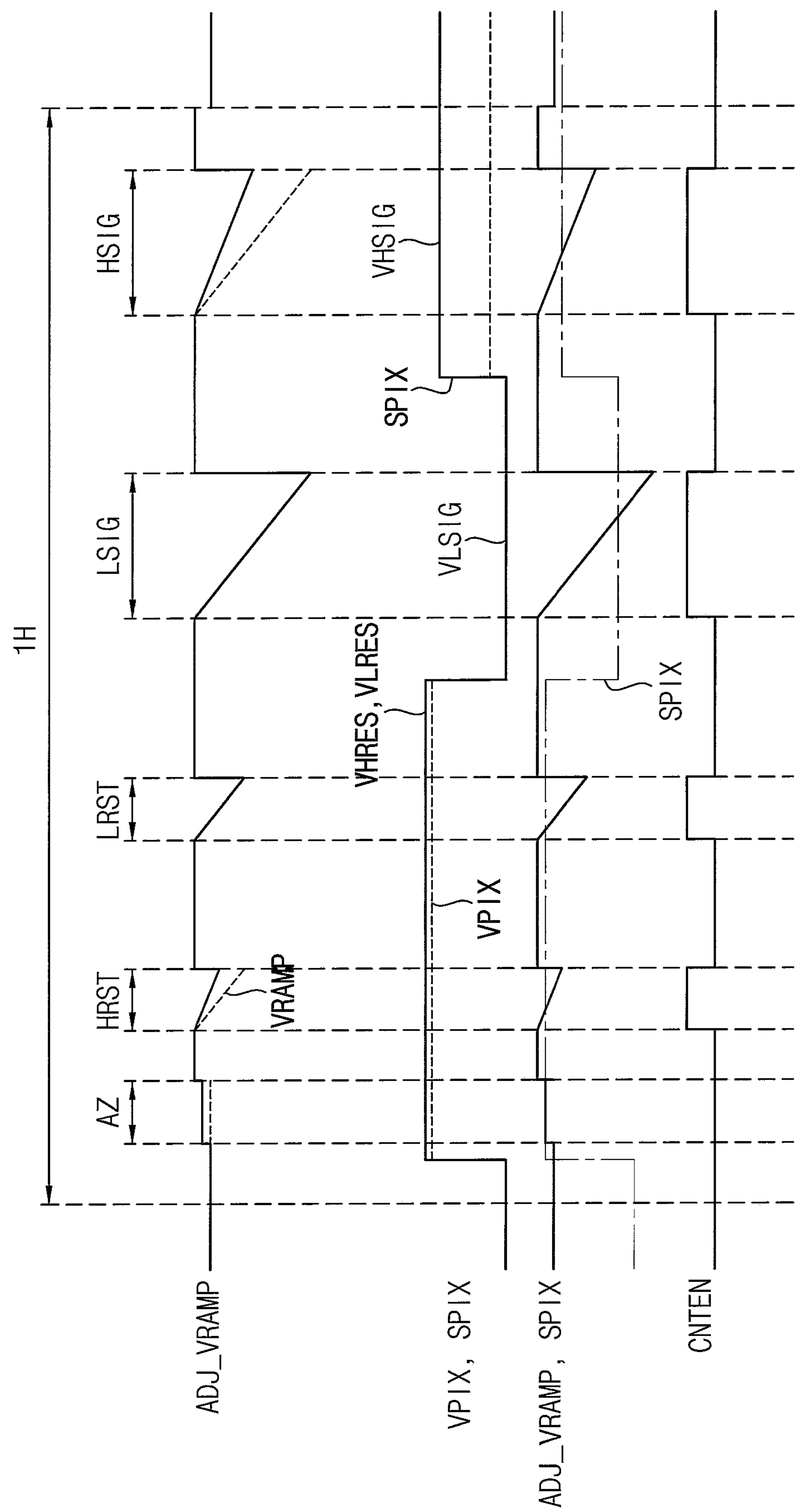

FIGS. 13 and 14 are timing diagrams illustrating operations of the image sensor of FIG. 1 operating at an ADC timing of Reset-Reset-Sig-Sig (RRSS).

The timing diagrams of FIGS. 13 and 14 are only different in an ADC timing in a process of processing an analog pixel signal compared to the timing diagrams of FIGS. 4 and 5, and thus duplicate description will be omitted below.

Referring to FIGS. 13 and 14, the first time period, i.e., 1H time period, may include a plurality of second time periods AZ, HRST, LRST, LSIG, and HSIG. After an auto zero period AZ, the 1H time period may sequentially include a high conversion gain reset signal period HRST, a low conversion gain reset signal period LRST, a low conversion gain image signal period LSIG, and a high conversion gain image signal period HSIG.

A high conversion gain reset signal VHRES may be output in the high conversion gain reset signal period HRST by applying a reset signal of a logic high level to a gate of the reset transistor 115 and applying a dual gain signal DRX of a logic low level to a gate of the dual gain transistor 120 before the high conversion gain reset signal period HRST. A low conversion gain reset signal VLRES may be output in the low conversion reset signal period LRST by applying a dual gain signal DRX of a logic high level to a gate of the dual gain transistor 120 before the low conversion reset signal period LRST.

A low conversion gain image signal VLSIG may be output in the low conversion gain image signal period LSIG by applying a reset signal RX of a logic low level to a gate of the reset transistor 115, applying a dual gain signal DRX of a logic high level to a gate of the dual gain transistor 120, and applying a transfer signal TX of a logic high level to a gate of the transfer transistor 107 before the low conversion gain image signal period LSIG. A high conversion gain image signal VHSIG may be output in the high conversion gain image signal period HSIG by applying a dual gain signal DRX of a logic low level to the dual gain transistor 120 and applying a transfer signal TX of a logic high level to a gate of the transfer transistor 107 before the high conversion gain image signal period HSIG.

As described above, the DCG pixel 110 may output the analog pixel signal VPIX, and the analog pixel signal VPIX may include a high conversion gain signal and a low conversion gain signal. The high conversion gain signal may include the high conversion gain reset signal VHRES and the high conversion gain image signal VHSIG, and the low conversion gain signal may include the low conversion gain reset signal VLRES and the low conversion gain image signal VLSIG. The descriptions provided above with reference to FIGS. 3, 6A, 6B, and 7 may be similarly applied in a process of processing an analog pixel signal when the image sensor operates at an ADC timing of Reset-Reset-Sig-Sig (RRSS).

Figure 15:
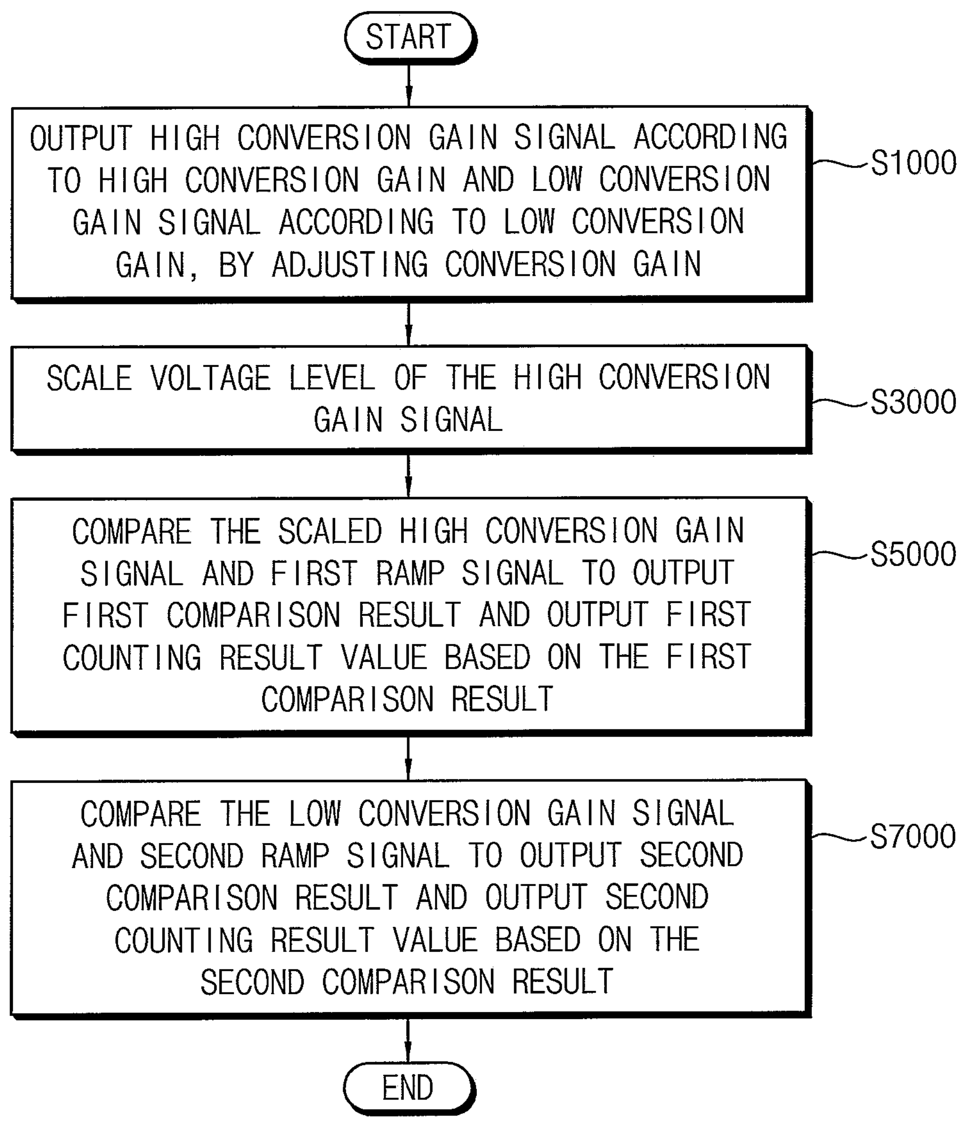
FIG. 15 is a flowchart illustrating a method of operating the image sensor of FIG. 1 according to an example embodiment.

FIG. 15 is a flowchart illustrating a method of operating the image sensor of FIG. 1 according to an example embodiment.

Referring to FIGS. 1 and 15, in a method of operating the image sensor according to an example embodiment, the image sensor 10 may adjust a conversion gain to output a low conversion gain signal according to a low conversion gain, and output a high conversion gain signal according to a high conversion gain (S1000). The image sensor 10 may scale a voltage level of the high conversion gain signal (S3000). The image sensor 10 may compare the scaled high conversion gain signal and a first ramp signal to output a first comparison result, and output a first counting result based on the first comparison result (S5000). The image sensor 10 may compare the low conversion gain signal and a second ramp signal to output a second comparison result, and output a second counting result based on the second comparison result (S7000).

Figure 16:
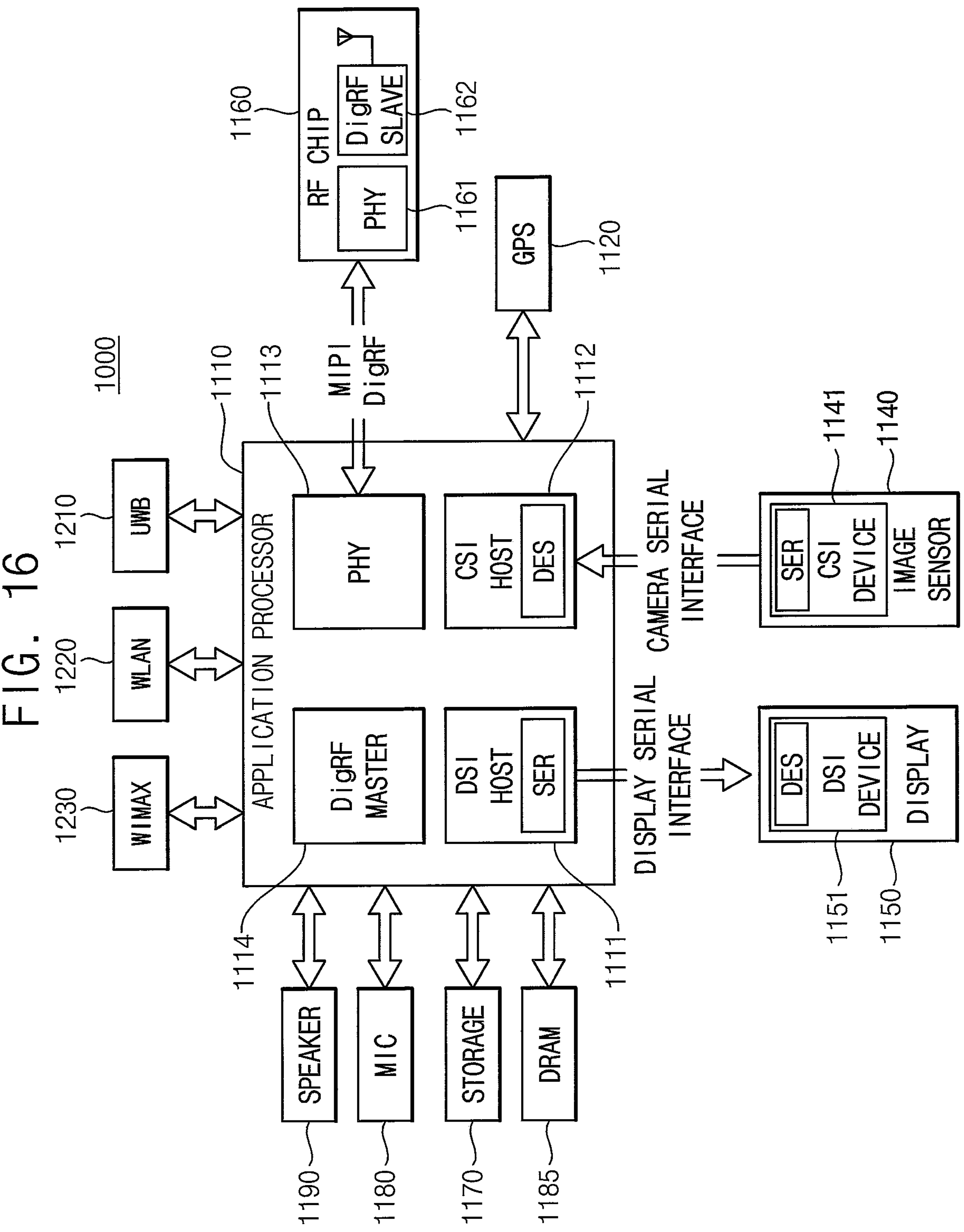
FIG. 16 is a block diagram illustrating an electronic system including an image sensor of FIG. 1 according to an example embodiment.

FIG. 16 is a block diagram illustrating an electronic system including an image sensor of FIG. 1 according to an example embodiment.

Referring to FIG. 16, an electronic system 1000 according to an example embodiment may be implemented as a data processing device that uses or supports a mobile industry processor interface (MIPI) interface. The electronic system 1000 may include an application processor 1110, an image sensor 1140, a display device 1150, a radio frequency (RF) chip 1160, a global positioning system (GPS) 1120, a storage 1170, a microphone (MIC) 1180, a dynamic random access memory (DRAM) 1185, and a speaker 1190. In addition, the electronic system 1000 may perform communications using an ultra wideband (UWB) 1210, a wireless local area network (WLAN) 1220, a worldwide interoperability for microwave access (WIMAX) 1230, etc.

The application processor 1110 may be a controller or a processor that controls an operation of the image sensor 1140. The image sensor 1140 may be an image sensor as described above in connection with FIG. 1 according to an example embodiment, and may perform or execute the method of operating the image sensor according to an example embodiment.

The application processor 1110 may include a display serial interface (DSI) host 1111 that performs a serial communication with a DSI device 1151 of the display device 1150, a camera serial interface (CSI) host 1112 that performs a serial communication with a CSI device 1141 of the image sensor 1140, a physical layer (PHY) 1113 that performs data communications with a physical layer (PHY) 1161 of the RF chip 1160 based on a MIPI DigRF, and a DigRF MASTER 1114 that controls the data communications of the physical layer 1161. A DigRF SLAVE 1162 of the RF chip 1160 may be controlled through the DigRF MASTER 1114.

In an example embodiment, the DSI host 1111 may include a serializer (SER), and the DSI device 1151 may include a deserializer (DES). In an example embodiment, the CSI host 1112 may include a deserializer (DES), and the CSI device 1141 may include a serializer (SER).

As described above, an image sensor, an image processing system including the image sensor, and a method of operating the image sensor according to an example embodiment may scale only a voltage level of a high conversion gain signal included in an analog pixel signal output from a DCG image sensor, and may not scale a voltage level of a low conversion gain signal. Through the scaling, a dynamic range of an image photographed in low light may be increased to increase a dynamic range of a finally generated digital signal and reduce a random noise.

Example embodiments may be applied to various electronic devices and systems including the image sensors. For example, example embodiments may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

Example embodiments may provide an image sensor, an image processing system including the image sensor, and a method of operating the image sensor, which may provide high dynamic range and reduce noise.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor, comprising:

a dual conversion gain (DCG) pixel configured to output a high conversion gain signal according to a high conversion gain and output a low conversion gain signal according to a low conversion gain, by adjusting a conversion gain;

a correlated double sampler including a scaler, the scaler being configured to receive the high conversion gain signal output from the DCG pixel, and to scale a voltage level of the high conversion gain signal by a predetermined integer multiple;

a ramp generator configured to generate a first ramp signal and a second ramp signal, a slope of the second ramp signal being different from a slope of the first ramp signal;

a comparator configured to compare the scaled high conversion gain signal and the first ramp signal to output a first comparison result, and compare the low conversion gain signal and the second ramp signal to output a second comparison result;

a counter configured to output a first counting result value based on the first comparison result and output a second counting result value based on the second comparison result; and a control unit configured to transmit analog gain information to the scaler, the analog gain information including information about the predetermined integer multiple, wherein:

the scaler is configured to scale only the high conversion gain signal, from among the high conversion gain signal and the low conversion gain signal, and the predetermined integer multiple is 2 or more.

2. The image sensor as claimed in claim 1, wherein the DCG pixel is driven within a first time period, wherein the first time period includes a plurality of second time periods, and wherein the plurality of second time periods include an auto zero period, a high conversion gain reset signal period, a high conversion gain image signal period, a low conversion gain image signal period, and a low conversion gain reset signal period.

3. The image sensor as claimed in claim 2, wherein the ramp generator adjusts an absolute value of the slope of the first ramp signal to be smaller than an absolute value of the slope of the second ramp signal.

4. The image sensor as claimed in claim 3, wherein the ramp generator adjusts the slope and an offset of the first ramp signal in the auto zero period such that the first ramp signal is compared with the scaled high conversion gain signal.

5. The image sensor as claimed in claim 1, wherein:

the DCG pixel includes:

a photoelectric converter, a transfer transistor, a reset transistor, a dual gain transistor, a drive transistor, and a selection transistor, and wherein:

the photoelectric converter is connected between a ground node and the transfer transistor, the transfer transistor is connected between the photoelectric converter and a first floating diffusion node, the reset transistor is connected between a power supply voltage and a second floating diffusion node, the dual gain transistor is connected between the first floating diffusion node and the second floating diffusion node, the drive transistor is connected between the power supply voltage and the selection transistor, the selection transistor is connected between the drive transistor and an output terminal of the DCG pixel, and the scaler is configured to receive an output of the selection transistor.

6. The image sensor as claimed in claim 5, wherein the conversion gain is adjusted by driving the dual gain transistor.

7. The image sensor as claimed in claim 6, wherein the conversion gain is adjusted to the low conversion gain by turning on the dual gain transistor, and is adjusted to the high conversion gain by turning off the dual gain transistor.

8. The image sensor as claimed in claim 1, wherein the high conversion gain is a greater conversion gain than the low conversion gain, and the conversion gain is a magnitude ratio of an analog pixel signal output from the DCG pixel with respect to a unit photo-charge generated by photoelectric conversion.

9. The image sensor as claimed in claim 1, wherein the ramp generator includes a variable ramp current source, a variable offset source, and a ramp resistor.

10. The image sensor as claimed in claim 1, wherein a noise generated by the image sensor is modeled including adders and a buffer.

11. The image sensor as claimed in claim 1, wherein a noise generated by the image sensor is affected by a shot noise, a conversion gain, a pixel noise, a Correlated-Double-Sampling (CDS) noise, an analog gain, and a quantization noise.

12. The image sensor as claimed in claim 11, wherein a dynamic range of a digital signal is increased when the analog gain is increased.

13. The image sensor as claimed in claim 11, wherein a magnitude of a random noise of a digital signal is reduced when the analog gain is increased.

14. An image processing system, comprising:

a dual conversion gain (DCG) pixel array including a plurality of DCG pixels, each DCG pixel being configured to output a high conversion gain signal according to a high conversion gain and output a low conversion gain signal according to a low conversion gain, by adjusting a conversion gain;

a ramp generator configured to generate a first ramp signal and a second ramp signal;

a correlated double sampler configured to receive the high conversion gain signal, scale a voltage level of the high conversion gain signal by a predetermined integer multiple, compare the scaled high conversion gain signal and the first ramp signal to output a first comparison result, and compare the low conversion gain signal and the second ramp signal to output a second comparison result;

a counter configured to output a first counting result value based on the first comparison result and output a second counting result value based on the second comparison result; and a control unit configured to transmit analog gain information to a scaler in the correlated double sampler, the analog gain information including information about the predetermined integer multiple, wherein:

the scaler is configured to scale only the high conversion gain signal, from among the high conversion gain signal and the low conversion gain signal, and the predetermined integer multiple is 2 or more.

15. The image processing system as claimed in claim 14, wherein:

each DCG pixel includes a photoelectric converter, a transfer transistor, a reset transistor, a dual gain transistor, a drive transistor, and a selection transistor, the selection transistor being configured to output the high conversion gain signal and the low conversion gain signal, and the scaler is configured to receive the high conversion gain signal from the selection transistor.

16. The image processing system as claimed in claim 15, wherein:

the photoelectric converter is connected between a ground node and the transfer transistor, the transfer transistor is connected between the photoelectric converter and a first floating diffusion node, the reset transistor is connected between a power supply voltage and a second floating diffusion node, the dual gain transistor is connected between the first floating diffusion node and the second floating diffusion node, the drive transistor is connected between the power supply voltage and the selection transistor, the selection transistor is connected between the drive transistor and an output terminal of the DCG pixel, and the scaler is configured to receive an output of the selection transistor.

17. The image processing system as claimed in claim 16, wherein the conversion gain is adjusted by driving the dual gain transistor.

18. The image processing system as claimed in claim 17, wherein the conversion gain is adjusted to the low conversion gain by turning on the dual gain transistor, and is adjusted to the high conversion gain by turning off the dual gain transistor.

19. A method of operating an image sensor, the method comprising:

outputting, from a dual conversion gain (DCG) pixel, a high conversion gain signal according to a high conversion gain and outputting a low conversion gain signal according to a low conversion gain, by adjusting a conversion gain;

outputting, from a control unit, analog gain information including information about a predetermined integer multiple;

receiving, by a scaler included in a correlated double sampler, the high conversion gain signal that is output by the DCG pixel and the analog gain information that is output by the control unit, and scaling a voltage level of the high conversion gain signal by the predetermined integer multiple, wherein the scaler is configured to scale only the high conversion gain signal, from among the high conversion gain signal and the low conversion gain signal, and the predetermined integer multiple is 2 or more;

outputting a first comparison result by comparing the scaled high conversion gain signal and a first ramp signal to output a first counting result value based on the first comparison result; and outputting a second comparison result by comparing the low conversion gain signal and a second ramp signal to output a second counting result value based on the second comparison result.

* * * * *